Patented Sept. 30, 1924.

1,510,074

UNITED STATES PATENT OFFICE.

CLAYTON WING BEDFORD, OF AKRON, OHIO, ASSIGNOR TO THE GOODYEAR TIRE & RUBBER COMPANY, OF AKRON, OHIO, A CORPORATION OF OHIO.

ACCELERATOR FOR THE VULCANIZATION OF CAOUTCHOUC.

No Drawing. Original application filed May 17, 1919, Serial No. 297,920. Divided and this application filed November 24, 1919, Serial No. 340,262. Again divided and this application filed June 10, 1922. Serial No. 567,433.

*To all whom it may concern:*

Be it known that I, CLAYTON W. BEDFORD, a citizen of the United States, and resident of Akron, Ohio, have invented new and useful Improvements in Accelerators for the Vulcanization of Caoutchouc, of which the following is a specification, this application being a division of application Serial Number 340,262.

This invention relates to the art of vulcanizing or curing caoutchouc substances and is fully set forth in the following specification:

In my Patent No. 1,371,662, dated March 15, 1921, I have set forth a process of vulcanizing caoutchouc substances wherein nitrogen containing bodies known as "accelerators" are employed, in accordance with which process the use of said nitrogen accelerators is facilitated and the results of their use in vulcanization processes improved by initially causing a reaction of the nitrogen accelerators employed with part or all of the sulphur of the rubber mix prior to incorporation into said mix to be vulcanized. In accordance therewith it is possible to carry out the reaction between the nitrogen accelerator and the sulphur at the temperature best suited thereto, to remove undesired gaseous or other by-products formed as the result of said reaction and in many cases to employ nitrogen accelerators which would otherwise be impractical or of no commercial value. The sulphur reaction product thus obtained, which is designated hereinafter as a sulphur-nitrogen accelerator, has in many cases a higher curing value than the nitrogen accelerator from which it is derived and frequently improves the quality of the product obtained on vulcanization.

In the present embodiment of my invention the nitrogenous compounds utilized are preferably of the type which may be characterized as Schiff's bases, which may be defined in general terms as the anhydro-reaction products of aldehydes and primary amines. As a limiting example of such compounds I intend also to include hexamethylenetetramine, which may be regarded as an anhydro-condensation product of formaldehyde and ammonia. It has furthermore been found that those of the said bases containing the methylene group are productive of particularly advantageous results in the process of the present invention.

As will be more fully hereinafter set forth, in the initial stage of the process wherein the nitrogen accelerator is reacted upon directly by sulphur, all of the sulphur required for the vulcanization process may be utilized or only a portion thereof. In general it is preferred that the relative proportions of the nitrogenous compounds and of the sulphur be such as to cause the sulphur to react completely with the nitrogenous compounds. Furthermore the reaction may take place in the presence of a solvent diluent such as the aromatic amine, amiline, said solvents in some instances also modifying the character of the resulting product as well as the course of the reaction.

An illustration of the process of the present invention, the methylene-containing Schiff's base, methylene-diphenyldiamine $(C_6H_5, NH)_2 \cdot CH_2$ may be caused to react with sulphur in the following proportions by weight:

198 parts methylene-diphenyldiamine.
64 parts sulphur.

These ingredients are slowly melted and then heated to 120–150° C., until approximately 34 parts by weight of gas (corresponding to approximately 1 mol. of $H_2S$) are eliminated. The reaction product is then steam distilled, about 93 parts (1 mol.) of aniline which has been produced during the reaction being thereby removed.

The product is a somewhat brittle reddish brown to yellowish brown amorphous mass having a conchoidal fracture and with a softening point so low that it may be compounded in the rubber mix without grinding.

In forming a rubber mix with the sulphur nitrogen accelerator thus produced, whereby the curing powers thereof may be illustrated, 16 parts of zinc oxide, 16 parts of plantation pale-crêpe rubber, one part of sulphur and 0.90 parts of the sulphur nitrogen accelerator above described may be mixed by the ordinary methods in rubber compounding. Such a mix will vulcanize in from fifteen to twenty minutes, whereas with a nitrogen accelerator not previously treated with sulfur and used in larger amounts (from 1.00 to 1.25 parts in the same mix) a curing period of approximately forty-five minutes is required. Furthermore the rubber produced by the use of the methylene-diphenyldiamine-sulphur accelerator is of somewhat higher tensile strength and greater expansibility than the rubber produced with the nitrogen accelerator untreated by sulphur.

As a further illustration of the initial reaction with sulphur the reaction between methylene-aniline (anhydro-formaldehyde-aniline) and sulphur may be utilized. The compound indicated by the term methylene-aniline is the product of reaction between formaldehyde and aniline in equimolecular proportions, and is a polymerized compound which may conveniently be considered as a di-polymer.

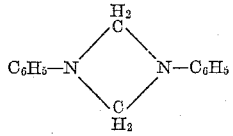

This product and sulphur may be caused to react in the following proportions:

210 parts (1 molecule of di-polymer) methylene-aniline.

64 parts sulphur.

These ingredients are slowly melted together and then heated to 150 to 170° C., until 34 to 36 parts of gas are removed. This gas consists principally of $H_2S$. Some $CS_2$ is also produced and eliminated in the course of the reaction. The product is then distilled until no more aniline passes over, the entire amount of aniline produced during reaction being thus driven off. After removal of the aniline the product is an amorphous dark reddish brown solid having resinous properties. It is brittle and may be ground; its softening point is, however, sufficiently low that grinding is not necessary for rubber compounding. The sulphur nitrogen accelerator thus produced may be incorporated into a mix of substantially the character of that previously described, likewise decreasing the length of time of cure and improving the tensile and elastic qualities of the vulcanized product.

As a further illustration of the reaction of such bases with sulphur, hexamethylenetetramine and sulphur may be caused to react in proportions (1 mol. of hexamethylenetetramine to at least 4 mols. of sulphur). This reaction results in an evolution of gas, and in the formation of yellow vapors which may be condensed as a reddish oil and a residual solid, yellowish brown in color and somewhat soft and sticky. The solid residue may be substituted in the example of the rubber mix previously given for the sulphur reaction product named.

As has been previously stated, the reaction between the nitrogen compounds and the sulphur may take place in the presence of a solvent diluent, which may in some instances take part in the reaction. Such a solvent or diluent may be utilized to control the rate and temperature of the reaction or may likewise be used to modify its course. The aromatic amines, and particularly aniline, has been found to be particularly useful and advantageous in forming the sulphur-nitrogen accelerators in the initial stage of the vulcanization process.

As an illustration of the use of a solvent diluent and particularly aniline, I may utilize methylene-aniline, sulphur and aniline in the following proportions:

210 parts methylene-aniline.

128 parts sulphur.

372 parts aniline.

The methylene-aniline and aniline are boiled under a reflux condenser for five hours at a temperature of 195° to 198° C., (thermometer in the liquid). The mixture is then cooled to 150° C., at which point the sulphur is added. The temperature is now raised slowly to 175° C. and held until 56 to 60 parts by weight of gas, principally hydrogen sulphide, are lost. The free aniline is now distilled off, preferably by steam distillation, care being taken to remove the last of the aniline from the reaction mixture to such an extent that the product will cool to a hard, brittle mass.

On using 1.25 parts of the sulphur-nitrogen accelerator thus produced in a rubber mix containing 1 part of sulphur, 16 parts zinc oxide and 16 parts of plantation pale-crêpe rubber, the mix will cure in approximately fifteen to twenty minutes, whereas if the nitrogen accelerator methylene aniline is used in the same mix, even to the extent of 1.50 parts, the time of cure is forty five to fifty minutes. In addition to shortening the time of cure thereby increasing the output of a given equipment, the product wherein the sulphur-nitrogen accelerator in use has a higher tensile strength, a higher modulus of elasticity and its quality is otherwise improved.

Methylene diphenyldiamine may likewise be utilized in a reaction similar to the above, substituting for the methylene-aniline a molecular proportion of the methylene diphenyldiamine. Hexamethylenetetramine may also be substituted in the reaction with sulphur and aniline, as above described, the product resulting from its use having the characteristics of a mixture of the product resulting from the use of methylene-aniline and methylene diphenyldiamine in the presence of aniline together with, apparently, the product of reaction of hexamethylene with sulphur. The product of reaction of methylene diphenyldiamine or of hexamethylenetetramine with sulphur in the presence of aniline may be substituted in the rubber mix.

What I claim is:

1. The process of producing a sulphur-nitrogen accelerator which consists in bringing together under reacting conditions sulphur and methylene-aniline.

2. The process of producing a sulphur-nitrogen accelerator which consists in bringing together under reacting conditions sulphur and methylene-aniline in the presence of an aromatic amine.

3. The process of producing a sulphur-nitrogen accelerator which consists in bringing together under reacting conditions sulphur and a methylene group-containing Schiff base in the presence of aniline.

4. The process of producing a sulphur-nitrogen accelerator which consists in bringing together under reacting conditions sulphur and methylene aniline in the presence of aniline.

5. The process of producing a sulphur-nitrogen accelerator which consists in admixing methylene-aniline and aniline, heating the mixture, subsequently adding sulphur thereto and again heating the mixture, eliminating hydrogen sulphide and aniline.

6. As an accelerator for the vulcanization of rubber, the brittle, resinous substance produced by the reaction of methylene-aniline and sulphur in the presence of aniline.

In witness whereof I have hereunto signed my name in the presence of two subscribing witnesses.

CLAYTON WING BEDFORD.

Witnesses:
O. E. BEE.
L. M. HARTMAN.